United States Patent [19]

Huttunen

[11] Patent Number: 5,532,568
[45] Date of Patent: Jul. 2, 1996

[54] METHOD FOR BRAKING AN ALTERNATING-CURRENT MOTOR

[75] Inventor: Ari Huttunen, Espoo, Finland

[73] Assignee: ABB Industry Oy, Helsinki, Finland

[21] Appl. No.: 399,372

[22] Filed: Mar. 6, 1995

[30] Foreign Application Priority Data

Mar. 24, 1994 [FI] Finland ................................. 941404

[51] Int. Cl.⁶ ............................................. H02P 3/18
[52] U.S. Cl. ........................... 318/757; 318/804; 318/368
[58] Field of Search ................................. 318/368, 722, 318/723, 757, 759–762, 798–804, 812

[56] References Cited

U.S. PATENT DOCUMENTS

| | | | |
|---|---|---|---|
| 4,263,542 | 4/1981 | Schulze et al. | 318/803 |
| 4,434,393 | 2/1984 | Kobari et al. | 318/757 |
| 5,099,184 | 3/1992 | Hornung et al. | 318/375 |

FOREIGN PATENT DOCUMENTS

| | | |
|---|---|---|
| 1077483 | 7/1967 | United Kingdom. |
| 2000397 | 1/1979 | United Kingdom. |
| WO90/01828 | 2/1990 | WIPO. |

*Primary Examiner*—Bentsu Ro
*Attorney, Agent, or Firm*—Watson Cole Stevens Davis

[57] ABSTRACT

The invention relates to a method for braking an alternating-current motor when the alternating-current motor (1) is supplied by a frequency converter (4) comprising an intermediate circuit (2). In accordance with the invention, when the voltage (uc) of the intermediate circuit (4) reaches a predetermined value during braking, the magnetization of the motor (1) is increased to increase the thermal losses of the motor, and, once the voltage (uc) of the intermediate circuit drops below said predetermined value, the increased magnetization is removed.

2 Claims, 1 Drawing Sheet

METHOD FOR BRAKING AN ALTERNATING-CURRENT MOTOR

BACKGROUND OF THE INVENTION

This invention relates to a method for braking an alternating-current motor when the alternating-current motor is supplied by a frequency converter comprising an intermediate circuit.

When an alternating-current motor supplied by a frequency converter comprising an intermediate circuit is being braked, the voltage of its intermediate circuit tends to rise. This is due to the fact that the motor then acts as a generator, supplying the energy of its mechanical system to the intermediate circuit. The braking ability of the system is thus also limited by the permitted increase in voltage for the intermediate circuit. If the voltage rises too much, the braking torque will have to be limited or, alternatively, excess energy will have to be fed into the network by means of a suitable arrangement such as an inverter. Excess energy can also be fed into a thermal resistance, whereby said resistance and a separate braking chopper are required. However, these alternatives require the use of additional devices, which complicate the system and add to the costs involved. The third alternative to boost braking is to employ direct-current braking; this, however, causes the control to lose the knowledge of the rotation speed of the motor. Consequently, direct-current braking is only applicable when the motor is to be braked to a complete standstill.

SUMMARY OF THE INVENTION

The object of the present invention is to introduce a new method for braking an alternating-current motor to be used when the alternating-current motor is supplied by a frequency converter comprising an intermediate circuit. The invention provides a method which can be applied without any additional devices, such as a braking chopper, having to be connected to the system. This is achieved with the method according to the invention, characterized in that when the voltage of the intermediate circuit reaches a predetermined value during braking, the magnetization of the motor is increased to increase the thermal losses of the motor, and once the voltage of the intermediate circuit drops below said predetermined value, the increased magnetization is removed.

Preferably, in order to increase the magnetization of the motor, the magnetization current is increased at the most up to a predetermined limit.

BRIEF DESCRIPTION OF THE DRAWINGS

In the following, the method according to the invention for braking an alternating-current motor is described in more detail with reference to the attached drawing, where.

DESCRIPTION OF THE PREFERRED EMBODIMENT

Figure 1:
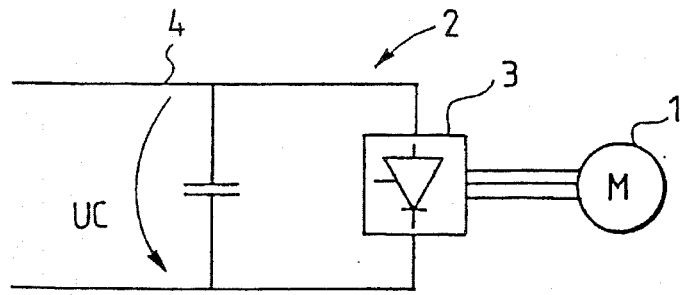
FIG. 1 is a diagram illustrating part of an alternating-current motor drive suitable for realizing the method according to the invention.

FIG. 1 is a diagram illustrating an alternating-current motor drive, where a motor 1 is supplied by a frequency converter 2 having an intermediate circuit 4 and an inverter 3 supplied by the intermediate circuit, the inverter 3 in turn supplying the motor 1. In attempting to brake the motor 1, a situation arises where the motor 1 starts to operate as a generator, converting its mechanical energy into electric energy, which passes to the intermediate circuit 4 of the frequency converter. Since no measures have been taken for feeding the energy forward from the intermediate circuit to, for example, the network by means of, for example, an inverter, the energy is stored in the intermediate circuit, resulting in a rise in the voltage uc of the intermediate circuit 4, which generally but not necessarily is a direct-current circuit. Normally, in a case like this, the braking torque of the motor would be decreased to such a degree that the increase in the voltage of the intermediate circuit would cease. A balance has then been achieved where the braking power of the motor 1 corresponds to the thermal losses of the motor 1 and the inverter 3 supplying the motor.

According to the invention, the braking power that can be achieved with the above-mentioned, conventional method is not settled for but additional measures according to the invention are taken to increase the braking power. In accordance with the invention, the magnetization of the motor 1 is increased by feeding excess magnetization current into the stator circuit of the motor 1 from the inverter 3. In practice, this is realized by increasing the output voltage of the inverter 3. The increase of the magnetization is initiated once the voltage of the intermediate circuit 4 reaches its predetermined upper limit uc-hi-lim. In addition to the increase in the stator current, another practical effect of increasing the magnetization of the motor is that a current proportional to the stator current is induced into the rotor of the motor. These stator and rotor currents cause a dissipation power by means of which braking can be effected, i.e. the mechanical energy of the motor can be consumed. This means that, in the method according to the invention, the losses of the motor are increased by increasing the thermal losses arising therein and also the magnetization losses. In this way, the energy of the mechanical system constituted by the motor can be converted to a greater extent than what is normally the case into thermal energy of the motor, and the braking torque can thus be higher.

In employing the method according to the invention, no major changes in the normal control arrangement of the motor are necessary. The use of the method only requires that the voltage of the intermediate circuit is monitored when the motor is being braked, and that the increase of the flux, and thus also the increase of the magnetization current, is started to the extent permitted by the predetermined limit of the current, when the voltage of the intermediate circuit exceeds the predetermined limit. When using the flux braking according to the invention, where the motor is braked by increasing the magnetization of the motor, the magnetization current can only be increased at the most up to a predetermined limit, in practice is determined either on the basis of the maximum output voltage of the inverter 3 or on the basis of the maximum stator current permitted for the motor 1, depending upon the heating of the motor. On the other hand, it is natural that the output voltage of the inverter 3, the raise in which causes the increase of the magnetization current, can only be increased to the maximum possible value of the inverter.

The flux braking according to the invention is disactivated when the voltage uc of the intermediate circuit 4 falls below the control limit of the overvoltage, i.e. the value uc-hi-lim. In this way, activating and disactivating the flux braking according to the invention is exclusively based on the monitoring of the intermediate circuit voltage uc. When the flux of the motor, i.e. its magnetization, is increased, the increase in the flux should of course be controlled, whereby the rate of the increase mainly depends on the time constant of the rotor.

Figure 2:
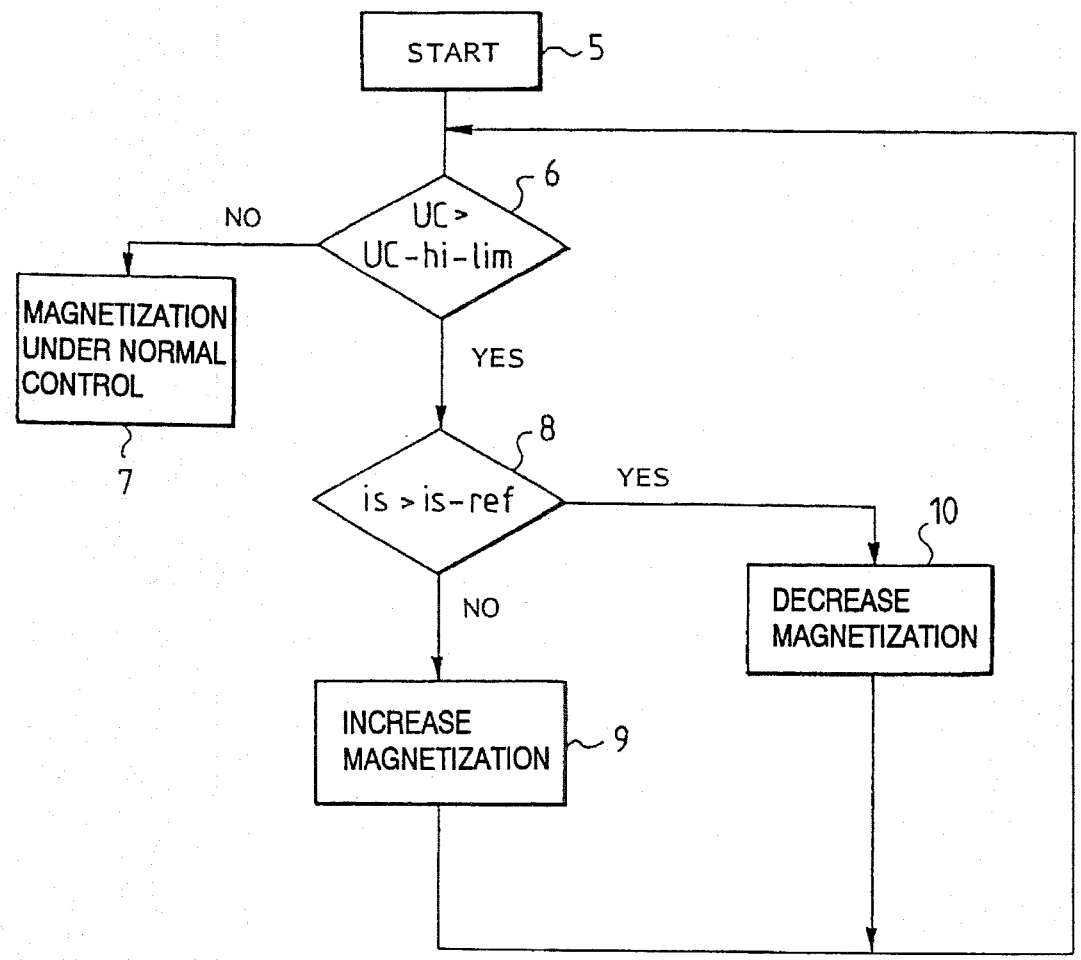
FIG. 2 is an exemplary flow diagram illustrating the method according to the invention.

FIG. 2 is an exemplary flow chart illustrating the method according to the invention. The start of the braking is marked with the reference numeral 5. When the braking command has been received, the monitoring of voltage uc of the intermediate circuit of the frequency converter is started in accordance with block 6 and it is tested whether this voltage has reached its permitted maximum value uc-hi-lim. If the voltage of the intermediate circuit does not exceed the value uc-hi-lim, block 7 is proceeded to, and, in accordance with this block, the braking is continued according to the normal control and with a magnetization according to the normal control. However, if the voltage of the intermediate circuit does exceed the value uc-hi-lim, block 8 is proceeded to, where it is tested whether the magnetization current exceeds its permitted maximum value is-ref. If the braking has just been started, it is probable that the current limit has not been reached but the braking power can be increased by increasing, in accordance with the invention, the magnetization in block 9. After this, block 6 is returned to for testing of the level of the intermediate circuit voltage and, depending on the level, either block 7 or block 8 is proceeded to.

When the magnetization of the motor is increased in accordance with the flow diagram of FIG. 2, sooner or later a situation arises where the magnetization current can no longer be increased but the permitted maximum level is-ref has been exceeded. In this case, one proceeds from block 8 to block 10 where the magnetization is decreased. On the other hand, as the braking progresses, at some stage a situation also arises where the intermediate circuit voltage drops below its limit uc-hi-lim, whereby one can proceed from block 6 to the normal control according to block 7.

I claim:

1. Method for braking an alternating-current motor when the alternating-current motor is supplied by a frequency converter comprising an intermediate circuit, the method comprising the steps of monitoring the voltage of the intermediate circuit;

increasing magnetization of the motor when the voltage of the intermediate circuit reaches a predetermined value in order to increase the thermal losses of the motor; and removing said increased magnetization of the motor when the voltage of the intermediate circuit drops below said predetermined value.

2. Method according to claim 1, wherein the increase of the magnetization of the motor is effected by increasing the magnetization current at the most up to a predetermined limit.

* * * * *